F. K. VREELAND.
RECEIVING SYSTEM FOR HIGH FREQUENCY ELECTRICAL OSCILLATIONS.
APPLICATION FILED NOV. 4, 1905.
936,684.
Patented Oct. 12, 1909.
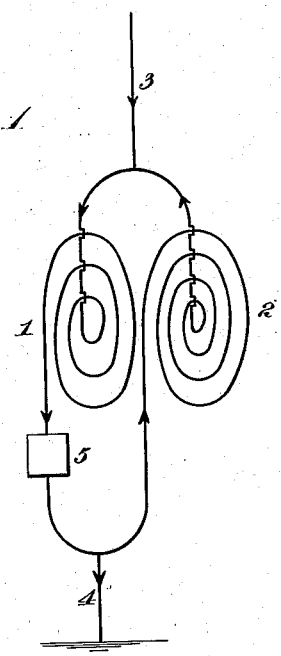
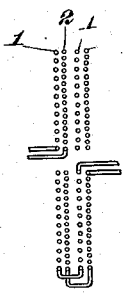
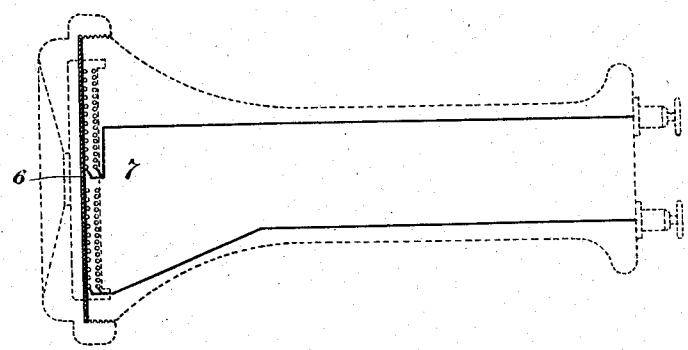
Witnesses:
Inventor
Frederick K. Vreeland
By Dyer & Dyer
Attorneys.

UNITED STATES PATENT OFFICE.

FREDERICK K. VREELAND, OF MONTCLAIR, NEW JERSEY, ASSIGNOR TO WIRELESS TELEGRAPH EXPLOITATION COMPANY, OF NEW YORK, N. Y., A CORPORATION OF NEW YORK.

RECEIVING SYSTEM FOR HIGH-FREQUENCY ELECTRICAL OSCILLATIONS.

936,684.  Specification of Letters Patent.  Patented Oct. 12, 1909.

Application filed November 4, 1905. Serial No. 285,862.

*To all whom it may concern:*

Be it known that I, FREDERICK K. VREELAND, a citizen of the United States, residing at Montclair, in the county of Essex and State of New Jersey, have invented a certain new and useful Improvement in Receiving Systems for High-Frequency Electrical Oscillations, of which the following is a description.

The object of this invention is to increase the effective working current in a wireless telegraph or telephone receiver or receiving system, for the purpose of magnifying its effect on the detector or other translating device. The operation of this current multiplier is based on the well known principle that in a system of conductors traversed by an alternating current of very high frequency the principal factor in controlling the distribution of the current throughout the system is not the resistance of the conductors, as it is when continuous or low frequency alternating currents are used, but their inductance, and that the currents in the system tend to distribute themselves in such a manner that the kinetic energy of the system as a whole shall be a minimum. A corollary of this law is that when two or more branch circuits are placed in a mutual inductive relation, the high frequency currents will tend to distribute themselves between these circuits in such a manner that the magnetic field, due to the currents in the system as a whole, shall be a minimum.

In carrying out the invention I employ two dissimilar coils of wire wound in close inductive relation, the dissimilarity being produced by giving the coils different numbers of turns, or by making them dissimilar in some other respect, as in the relative arrangement of the coils, so that the mutually interlinked flux will produce more electromotive force in one coil than in the other. The coils are connected in parallel in the circuit carrying the current to be multiplied. These two coils are wound in the same direction with relation to the main circuit, and are similarly connected in that circuit, so that the current in the main circuit tends to produce in them magnetic fields which augment each other. The larger resultant current however, which flows through the local circuit formed by the two coils, produces opposing fields in these coils, as will be presently explained.

Figure 1 shows diagrammatically such a pair of dissimilar coils 1, 2 connected in parallel in the circuit 3, 4 carrying the current to be multiplied, which circuit 3, 4 is here represented as the grounded antenna circuit of an ordinary wireless telegraph receiving system. The coil 1 is illustrated as having three turns, and the coil 2 as having four turns, although in practice the number of turns of each coil should usually be much greater than this. When so arranged, the currents in the coils 1, 2 will each be greater than the current in the main circuit 3, 4, and at any given instant the currents in these two coils will flow in opposite directions, so that their algebraic sum, that is, the difference of their arithmetical values, is equal to the current in the circuit 3, 4. A detector or other translating device 5 may be placed in either of the branch circuits, though it is preferably placed in the one which has the smaller number of turns and hence the larger current; or detectors may be placed in both branches. The detector is preferably one whose ohmic resistance is as low as possible. The application of the broad principle outlined above to this specific form of apparatus is as follows: If the current in the circuit 3, 4 were a continuous or low frequency alternating one, it would divide between the circuits 1, 2 in inverse proportion to their ohmic resistances. The result would be that the magnetic fields produced by the currents in the two coils would overlap and augment each other, as the currents would flow through the two coils in the same direction. Consequently the kinetic energy of the field due to both coils together is greater than that of the field due to either. As the frequency of the current is increased, the importance of the inductance of the system in determining the current distribution becomes greater and greater, until at very high frequencies it is the controlling factor, and the ohmic resistance of the circuits becomes comparatively negligible. The tendency is, as stated above, for the currents to distribute themselves between the two coils in such a manner that the energy of the resulting magnetic field shall be a minimum. This is accomplished when the currents in the coils 1, 2 flow in opposite directions and are inversely proportional to the number of turns of their respective coils. Thus when the coil 1 has three turns and the coil 2 four turns, the current in the former will be 4 units and that in the latter 3 units, so that the resulting ampere turns of both coils will be zero; the current in the main circuit 3, 4, which is equal to the algebraic sum of the two branch currents, will then be 1 unit. Looking at the matter from another point of view, the system of two coils illustrated in Fig. 1 may be considered as constituting a transformer short-circuited upon itself. Suppose for a moment that the current in the main circuit 3, 4, which we will assume to have a value of 1 unit, divides equally between the coils 1, 2, each of which carries $\frac{1}{2}$ unit: the result would be a magnetic flux interlinked between the two coils, and this alternating magnetic flux will induce an electromotive force in each coil. As the coil 2 has the greater number of turns, its electromotive force will be greater than that of the coil 1, and the result will be a local current flowing through the circuit 1, 2 in the direction indicated by the arrows. The magnetic field due to this local current will oppose that due to the assumed initial current, and the limiting value of the local current is that at which the two fields neutralize each other. This occurs in the specific case assumed when the local current has a value of $3\frac{1}{2}$ units; the current in the coil 1 will then be $\frac{1}{2}+3\frac{1}{2}=4$ units, and the current in the coil 2 will be $\frac{1}{2}-3\frac{1}{2}=-3$ units, and their algebraic sum is equal to the main current, i. e. 1 unit, as stated above.

It will be noted that the multiplying factor of the device increases as the ratio of turns in the two coils approaches unity. In the ideal case where the two coils have almost the same number of turns, the local current would be almost infinite; but such a condition is obviously impossible in practice, for a point is eventually reached at which the ohmic resistance of the system begins to play an important part and destroys the effectiveness of the device. Hence it is desirable to make the ohmic resistance as low as possible, and the self induction of each coil and their mutual induction as high as possible. To this end the coils should preferably be wound on the same bobbin and in as close a mutual relation as possible. I have found that the apparatus, when suitably designed and properly used, gives a multiplying effect practically equal to the full theoretical value; thus with two coils having a ratio of turns of three to four, I have obtained a multiplying factor of almost four to one.

Fig. 2 shows in cross-section a suitable arrangement in which the coil 1 is divided into two sections having each twelve turns, and the coil 2 is divided into two sections alternating with the section of the coil 1 and having each sixteen turns, the current entering at the middle of one section and leaving at the middle of the second section of each coil. The coils are shown for the sake of clearness as having a comparatively small number of turns, though usually a larger number would be desirable.

The requirement of low ohmic resistance of the system applies also to the detector 5, which should preferably be of some low resistance type, such for example as one in which the mechanical action between two adjacent coils carrying high frequency alternating signal impulses is caused to produce an audible or otherwise observable signal. This detector may be connected in either of the branches of the multiplying device, as shown in Fig. 1; or, if desired, the functions of current multiplier and detector can be combined in one apparatus, i. e. the coils 1 and 2 of Fig. 1 can be so arranged as to be relatively movable, and the mechanical forces between them may be utilized to produce the signal. Such an arrangement is shown in Fig. 3, which is a longitudinal section of a telephone form of detector, in which one coil is mounted upon a telephone diaphragm 6 of elastic insulating material, and the other coil is immovably mounted adjacent to the first coil upon the insulating body 7. The coils, while being wound and connected in similar senses mechanically or structurally with relation to the main circuit, are in effect wound oppositely with relation to the flow of the current through them, because their mutual inductive action produces in them currents flowing in opposite directions. The coils therefore produce magnetic fields which are mutually opposed, and such coils are arranged in close inductive relation, and the force producing the mechanical movement of the diaphragm is one of repulsion.

In Fig. 1 the current multiplier is shown, for the sake of clearness, connected in a simple antenna circuit, although it is obvious that it may be used effectively in any receiver circuit carrying a high frequency current which it is desired to multiply, provided the necessary conditions are fulfilled, as already stated.

What I claim is:

1. In a receiving system for high frequency electrical oscillations, a current multiplier comprising dissimilar coils traversed by the oscillations and wound in close inductive relation, such coils acting on each other so as to reverse the current in one coil and thereby augment the current in the other coil, in combination with means for detecting the augmented oscillations, substantially as set forth.

2. In a receiving system for high frequency electrical oscillations, the combination of dissimilar coils wound in close inductive relation and connected in parallel and in the same sense in a circuit traversed by the oscillations, thereby augmenting the oscillations, and means for detecting the augmented oscillations, substantially as set forth.

3. In a receiving system for high frequency electrical oscillations, a combined receiver and current multiplier having in combination dissimilar coils traversed by the oscillations and wound in close inductive relation, such coils acting on each other so as to reverse the current in one coil and thereby augment the current in the other coil and being mounted so as to be relatively movable, and means for translating the relative movement of the coils into observable signals, substantially as set forth.

4. In a receiving system for high frequency electrical oscillations, the combination of dissimilar coils wound in close inductive relation and connected in parallel and in the same sense in a circuit traversed by the oscillations, a support for such coils permitting the relative movement of the coils, and means for translating such relative movement of the coils into observable signals, substantially as set forth.

5. In a receiving system for high frequency electrical oscillations, the combination of dissimilar coils wound in close inductive relation and connected in parallel and in the same sense in a circuit traversed by the oscillations, a support for the coils permitting their relative movement, and a diaphragm affected by such relative movement of the coils to produce audible signals, substantially as set forth.

This specification signed and witnessed this second day of November, 1905.

FREDERICK K. VREELAND.

Witnesses:
JNO. ROBT. TAYLOR,
JOHN S. LOTSCH.